No. 657,677. Patented Sept. 11, 1900.
A. ROESCH.
AUTOMATIC TEMPERATURE REGULATOR.
(Application filed May 9, 1898.)
(No Model.) 3 Sheets—Sheet 1.

WITNESSES:
D. H. Haymond
J. C. Chapin

INVENTOR
Alfred Roesch
BY
James Bower
ATTORNEY

No. 657,677. Patented Sept. 11, 1900.
A. ROESCH.
AUTOMATIC TEMPERATURE REGULATOR.
(Application filed May 9, 1898.)
(No Model.) 3 Sheets—Sheet 2.

WITNESSES: INVENTOR
Alfred Roesch
BY
ATTORNEY

No. 657,677. Patented Sept. 11, 1900.
A. ROESCH.
AUTOMATIC TEMPERATURE REGULATOR.
(Application filed May 9, 1898.)
(No Model.) 3 Sheets—Sheet 3.
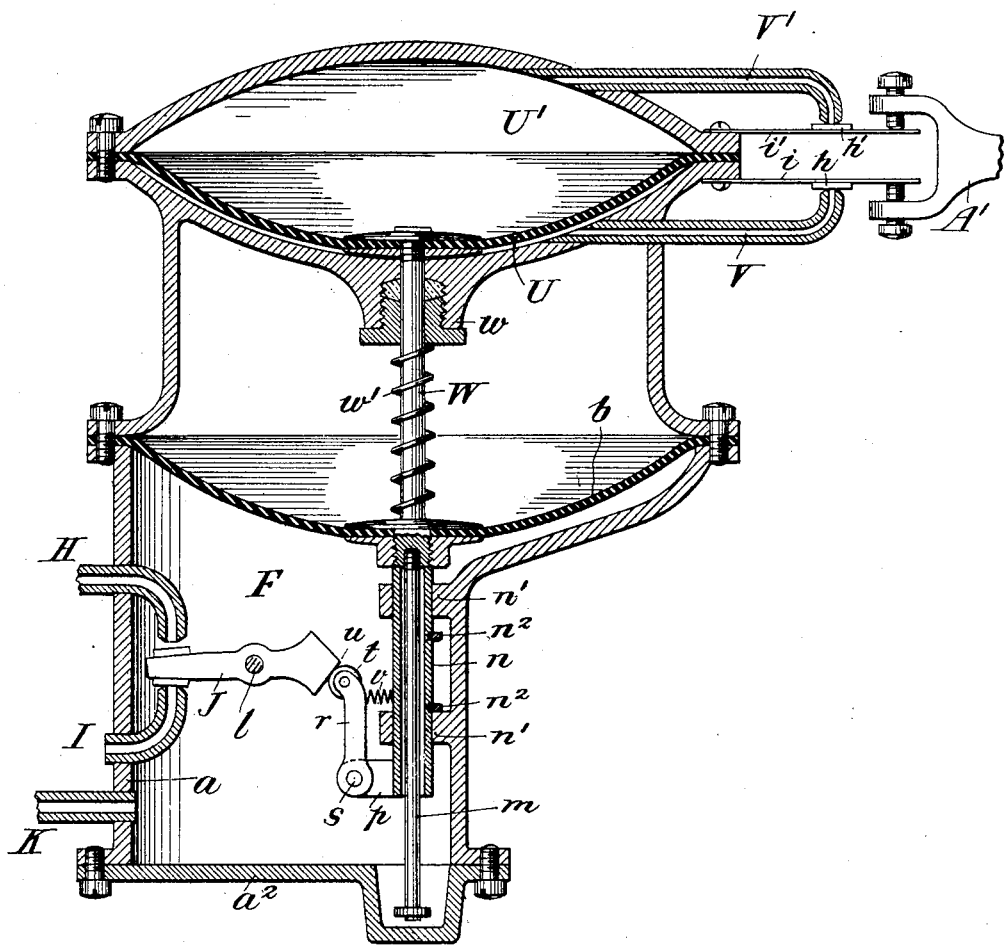

UNITED STATES PATENT OFFICE.

ALFRED ROESCH, OF BRIDGEPORT, CONNECTICUT, ASSIGNOR TO THE DAVIS & ROESCH TEMPERATURE CONTROLLING COMPANY, OF NEW JERSEY.

AUTOMATIC TEMPERATURE-REGULATOR.

SPECIFICATION forming part of Letters Patent No. 657,677, dated September 11, 1900.

Application filed May 9, 1898. Serial No. 680,104. (No model.)

*To all whom it may concern:*

Be it known that I, ALFRED ROESCH, a citizen of the United States of America, and a resident of Bridgeport, county of Fairfield, State of Connecticut, have invented certain new and useful Improvements in Automatic Temperature-Regulators, of which the following is a specification.

My invention relates to devices for governing the temperature of a room, and has for its object the provision of a simple and effective device under control of a thermostat for controlling the admission and exhaust of fluid-pressure to and from a fluid-actuated valve, damper, or similar mechanism; and to this end my invention consists of a diaphragm the movement of which controls the passage of air from an air-reservoir to such controlling means in a heating system as may be desired, in this case a steam-supply valve for a radiator, the movement of the diaphragm being itself controlled by the opening and closing of air-valves to its inclosing chamber by a thermostat.

My invention further consists in certain novel combinations of parts and details of construction, as will be hereinafter more fully described.

Figure 1:
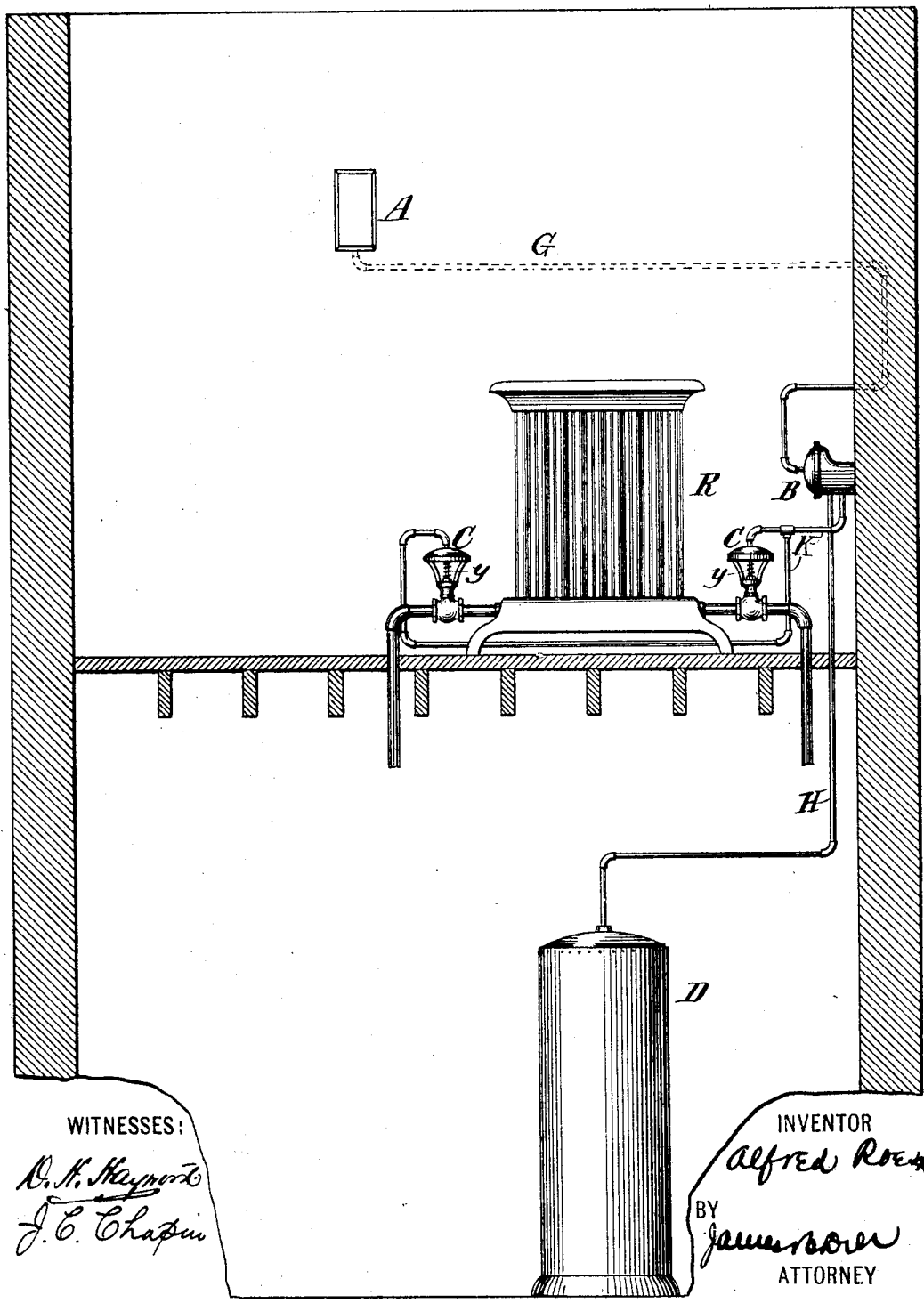
Figure 2:
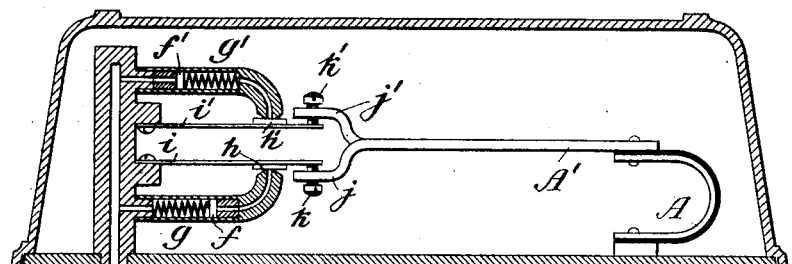
Figure 3:
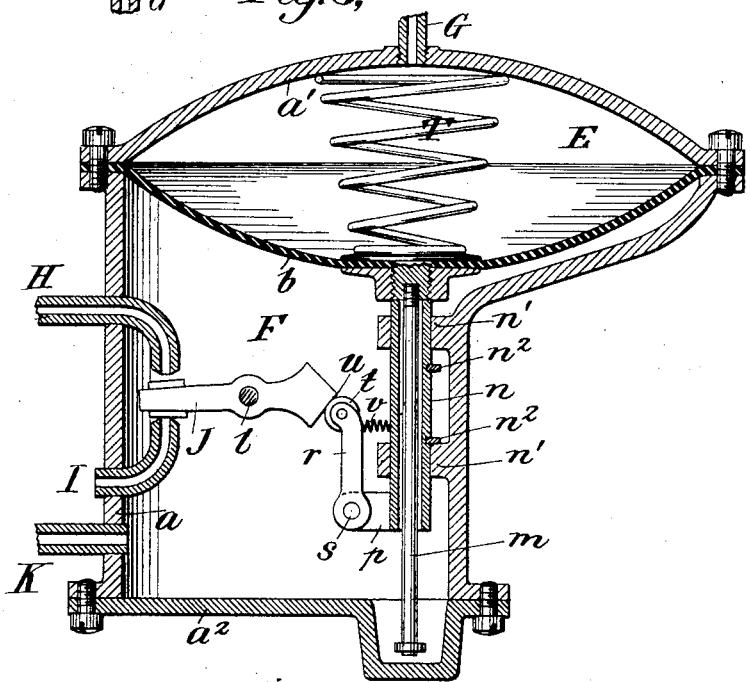
Figure 4:
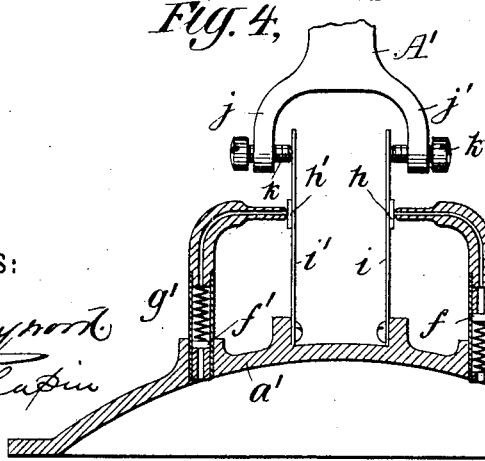

Figure 1 is a general view of the device and its connections. Fig. 2 is a side elevation of the thermostat and valves operated thereby and shows longitudinal sections of the parts controlled by said valves. Fig. 3 is a longitudinal section of the diaphragm-chamber and diaphragm and of the valve-chamber with its valve-controlling device. Fig. 4 shows a slight variation in the form of my device, where the inlet and outlet ports controlled by the thermostat are directly connected with the diaphragm-chamber instead of to a pipe leading from said chamber. Fig. 5 is a modification of my improvement in which a second diaphragm is used. Fig. 6 is the thermostat with its connecting-arm having its end bifurcated.

Similar reference characters designate corresponding parts in all figures.

My improvement comprises in general a thermostat A, valve-chamber B, steam-valves C C, air-reservoir D, and radiator R.

Referring to Fig. 3, $a$ is a valve-casing having heads $a'$ and $a^2$ bolted thereto. A diaphragm $b$ divides said casing into two separate chambers E and F. Leading into chamber E is a pipe G. The outer end of pipe G is formed with branches $g$ and $g'$, one located above the other, having nozzles turned inward toward each other. Pipe $g$ forms an air-intake through which air is admitted through pipe G to chamber E. Within said intake is check-valve $f$, which prevents the return of air therethrough. Pipe $g'$ forms an outlet from chamber E through pipe G and is provided with a check-valve $f'$, which prevents the inflow of air through said pipe. It will thus be seen that by the movement of diaphragm $b$ chamber E is filled with air through intake $g$ and air is expelled therefrom through outlet $g'$. Said inlet and outlet openings are controlled by valves $h$ $h'$, carried by springs $i$ $i'$, which springs act to hold said valves to their seats and normally close said openings. Thermostat A is of ordinary construction and carries an arm $A'$, formed with a bifurcated end, or arms carrying adjusting-screws $k$ and $k'$, so adjusted as to respectively contact with springs $i$ $i'$ and by a slight movement force the valves $h$ $h'$, which they carry, from their seats. Chamber F communicates through pipe H with the air-reservoir D and with the atmosphere through pipe I. Pipe K leads from said chamber to steam supply and return valves C C in radiator R. These valves may by any well-known means be closed by the pressure of air admitted from chamber F through pipe K and opened by springs $y$ $y$ when said air is exhausted. Pipes H and I lead into the interior of chamber F and are inclined toward each other therein. J is a valve controlling the openings in said pipes, and consists of a lever pivoted at $l$, formed at its outer end with valves which alternately close and open the openings into pipes H and I and at its other end formed with an incline terminating at a point $u$. Said valve is held to its seat and actuated by the following mechanism: Connected to diaphragm $b$ is a rod $m$, which moves up and down with said diaphragm through hollow sleeve $n$. Rod $m$ is enlarged near its lower end, and when it moves upwardly such enlarged portion contacts with said hollow sleeve $n$. The sleeve $n$ is mounted to slide freely in projections $n'$ $n'$ in the casing $a$. Stops $n^2$ $n^2$ limit the movement of the sleeve $n$. Attached to sleeve $n$ is bracket $p$, carrying arm $r$, pivoted to said bracket at $s$ and having at its outer end a roller $t$. A coiled spring $v$ retains said arm in proper position and allows a movement of said arm on said pivot $s$. Roller $t$ contacts with said valve J and holds it firmly to its seat when diaphragm $b$ is at rest. When said diaphragm is actuated, however, and near the end of its movement, rod $m$ strikes the sleeve $n$, carrying the said sleeve and with it the arm $r$ and appurtenances for the remainder of its movement, which movement of arm $r$ and roller $t$ forces said valve to its alternate position, thus opening one of its ports and closing the other.

The operation of the device is as follows: As shown in the drawings, the parts are in the position assumed when the temperature is above a point at which the thermostat A is adjusted to move valve $h'$ from its seat by contraction due to the fall in temperature. Chamber E is filled with air. Chamber F is in open communication with air-reservoir D and is thus under reservoir-pressure, which pressure acts through pipe K to force valves C to their seats and shut off the steam-supply to radiator R. Spring T in chamber E, together with the air therein, (which is prevented from escaping through pipe G and branch $g'$ by valve $h'$,) holds diaphragm $b$ in its downward position against the reservoir-pressure in chamber F. The different parts continue in their relative positions until through the fall in temperature thermostat A contracts sufficiently to move valve $h'$ from its seat and close valve $h$, when the reservoir-pressure in chamber F will immediately raise diaphragm $b$ and with it rod $m$ and sleeve $n$ with arm $r$, forcing roller $t$ past point $u$, opening exhaust I and closing inlet-port in pipe H. Chamber F thus being cut off from reservoir-pressure and the exhaust being open, air will exhaust therefrom and through said chamber from valve-chambers C C and permit said valve C C through the action of springs $y$ $y$ to open to admit steam to the radiator. The parts will remain in this position until the temperature has been raised sufficiently to expand thermostat A and permit valve $h'$ to seat, which movement will also raise valve $h$ from its seat, for until this occurs diaphragm $b$ will not return to its downward position (to which position it is moved by tension of spring T) because the inlet-port being closed prevents this movement. When, however, valve $h$ is moved from its seat, the diaphragm $b$ is moved downward, and the rod $m$ and sleeve $n$ with arm $r$ are carried with it and the parts again assume the positions shown in the drawings.

As shown in Fig. 4, the branch pipes $g$ $g'$ may, if desired, be placed upon the casing-head $a'$ and the thermostat immediately over same instead of connecting same some distance away through a pipe, as G.

Referring now to Fig. 5, I have shown, as will be seen, an auxiliary diaphragm and diaphragm-chamber U and U'. Branch pipes V and V' communicate with the upper and lower side of the chamber U' and are controlled by valves $h$ $h'$, mounted on springs $i$ $i'$ and operated through a thermostat-arm A', as previously described in the other figures. Small figure to the right shows the thermostat A with the connecting-arm A'. This thermostat may be located at any point convenient to the device with which it is connected. The diaphragm U is connected to the diaphragm $b$ by a rod W, which passes through a stuffing-box and gland $w$ through the chamber U'. A spring $w'$ surrounds the rod W and tends to keep the diaphragm in the position shown in this figure. When the thermostat-arm A' rises owing to the contraction of the thermostat, air is admitted through the branch V to the under side of the diaphragm U, and thus releasing the air-lock permits the air-pressure in the chamber F from the reservoir D to raise the diaphragm $b$ and carry with it the diaphragm U. The parts being now in the opposite positions to that shown in Fig. 5 and the valve J having cut off the air-pressure in the chamber F and opened it to the atmosphere, immediately the thermostat-arm A' lowers the spring $w'$ will return the parts to the first position, air being taken in through the branch V' and expelled through the branch V.

What I claim is—

1. A governor for controlling the supply of compressed fluid to fluid-actuated mechanism consisting of a diaphragm-chamber and diaphragm, ports from the chamber on one side of the diaphragm leading to the supply of compressed fluid, to the fluid-actuated mechanism and to the atmosphere, valves mounted on a rocker-arm adapted to alternately open and close the port to the supply of compressed air and the exhaust to atmosphere, means operated by the movement of the diaphragm for governing said valve and means operated by a thermostat for controlling the movement of the diaphragm, substantially as described.

2. A governor for controlling the supply of compressed fluid to fluid-actuated mechanism, consisting of a diaphragm-chamber and diaphragm, ports from the chamber on one side of the diaphragm leading to the supply of compressed fluid, to the fluid-actuated mechanism and to the atmosphere, means operated by the movement of the diaphragm for alternately opening and closing the port to the supply of compressed air and the exhaust to atmosphere and an inlet and an outlet port communicating with the atmosphere connected with the chamber on the other side of the diaphragm, having valves controlled by a thermostat, substantially as described.

3. A governor for controlling the supply of compressed fluid to fluid-actuated mechanism consisting of a diaphragm-chamber and diaphragm, ports from the chamber on one side of the diaphragm leading to the supply of compressed fluid, to the fluid-actuated mechanism and to the atmosphere, means operated by the movement of the diaphragm for alternately opening and closing the port to the supply of compressed air and the exhaust to atmosphere and an inlet and an outlet port communicating with the atmosphere connected with the chamber on the other side of the diaphragm, valves under the control of a thermostat for opening and closing said ports and check-valves within said ports for preventing the ingress of fluid of the one and the egress of fluid in the other, substantially as specified.

4. A governor for controlling the supply of compressed fluid to fluid-actuated mechanism, consisting of a diaphragm-chamber and diaphragm, ports from the chamber on one side of the diaphragm leading to the supply of compressed fluid, to the fluid-actuated mechanism and to the atmosphere, a rocker-arm mounted within said chamber, valves mounted on said rocker-arm and adapted to alternately open and close the port to the supply of compressed air and the exhaust to atmosphere, an arm controlled by the movement of the diaphragm to trip said rocker-arm, and an inlet and an outlet port connected with the chamber on the other side of the diaphragm having valves controlled by a thermostat, substantially as specified.

5. A governor for controlling the supply of compressed fluid to fluid-actuated mechanism consisting of a diaphragm-chamber and diaphragm, ports from the chamber on one side of the diaphragm leading to the supply of compressed fluid, to the fluid-actuated mechanism and to the atmosphere, valves mounted on a rocker-arm adapted to alternately open and close the port to the supply of compressed air and the exhaust to atmosphere, means operated by the movement of the diaphragm for governing said valves, a spring operating to move the diaphragm in one direction and means operated by a thermostat for controlling the movement of the diaphragm, substantially as described.

6. A governor for controlling the supply of compressed fluid to fluid-actuated mechanism consisting of a diaphragm-chamber and diaphragm, ports from the chamber on one side of the diaphragm leading to the supply of compressed fluid, to the fluid-actuated mechanism and to the atmosphere, a rocker-arm mounted within said chamber, valves mounted on said rocker-arm and adapted to alternately open and close the port to the supply of compressed air and the exhaust to atmosphere, an arm carried by a sleeve having a limited movement within the diaphragm-chamber and adapted to throw the rocker-arm first in one direction and then in the other, means carried by the diaphragm to cause such limited movement of said sleeve at the end of its stroke, and means operated by a thermostat for controlling the movement of the diaphragm, substantially as described.

Signed by me in the city, county, and State of New York this 21st day of April, 1898.

ALFRED ROESCH.

Witnesses:
JAMES C. CHAPIN,
JNO. S. PARKER.